United States Patent [19]

David

[11] Patent Number: 4,535,724

[45] Date of Patent: Aug. 20, 1985

[54] TRAINING AND CARE APPARATUS FOR HORSES

[76] Inventor: Constant V. David, 4952 Field St., San Diego, Calif. 92110

[21] Appl. No.: 637,113

[22] Filed: Aug. 2, 1984

[51] Int. Cl.³ .............................................. A01K 15/00
[52] U.S. Cl. ......................................... 119/29; 54/71; 119/96
[58] Field of Search ................... 119/29, 29 A, 96; 54/71, 7; 604/37

[56] References Cited

U.S. PATENT DOCUMENTS

| | | | | |
|---|---|---|---|---|
| 803,474 | 10/1905 | Dennis | ................................. | 604/37 |
| 874,239 | 12/1907 | Ratliff | ................................. | 119/96 |
| 887,524 | 5/1908 | Roberts | ................................. | 119/96 |
| 891,515 | 6/1908 | Wuest | ................................. | 119/96 |

*Primary Examiner*—Jay N. Eskovitz

[57] ABSTRACT

An apparatus, operated by the horse rider or trainer, is combined with the conventional bridle-bit-reins assembly normally used to govern a horse. In addition to and independently from the other means of control available to a horse handler, the apparatus provides means to the rider for rewarding or punishing his horse immediately, in a manner which is neither injurious nor abusive to his mount and which can even be beneficial to the horse's health, according to the horse's behavior or responses to the handler's command. The apparatus control is located and fastened on each one of the two reins, one intended for reward and the other for punishment, in such a manner that the motion of a finger of the hand holding that rein suffices to administer either reward or punishment instantly, as the occasion and circumstances warrant. The power source, the reward-/punishment media and those media storing and dispensing means are all attached to and supported by the bridle.

13 Claims, 8 Drawing Figures

U.S. Patent  Aug. 20, 1985  4,535,724
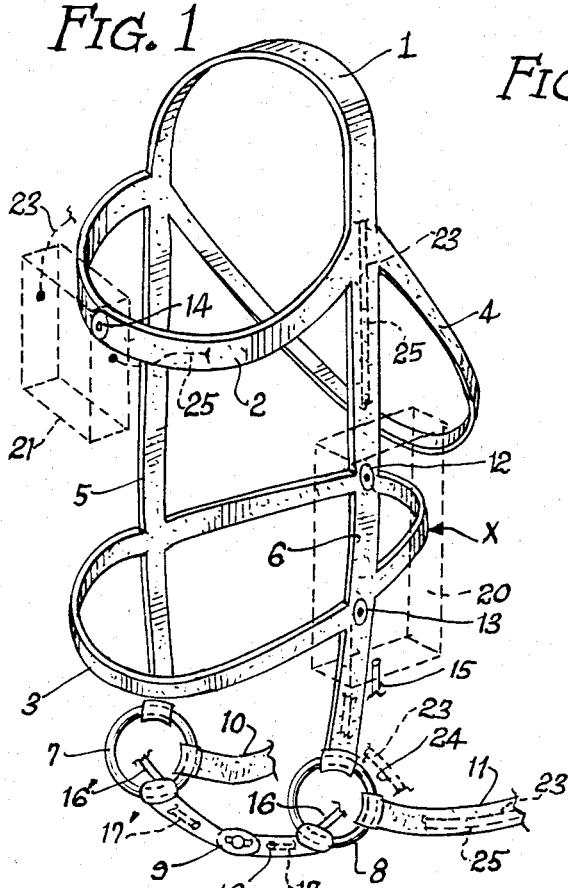
FIG. 1
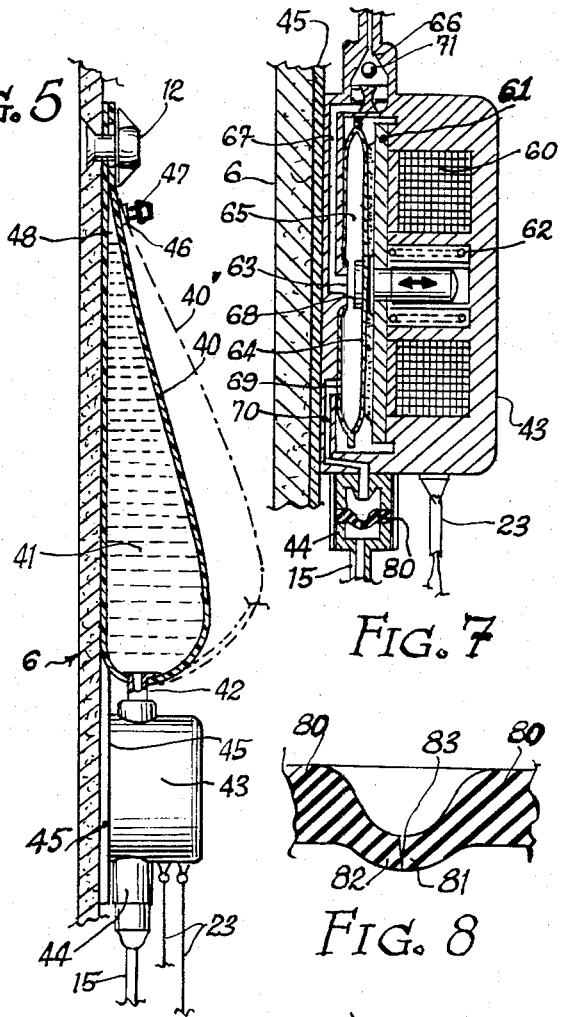
FIG. 5
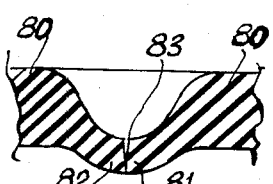
FIG. 7
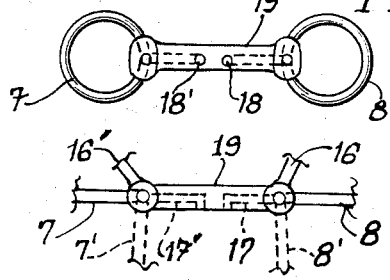
FIG. 2
FIG. 3
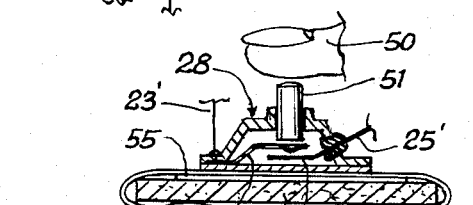
FIG. 8
FIG. 6
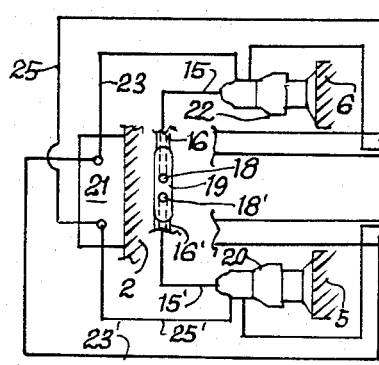
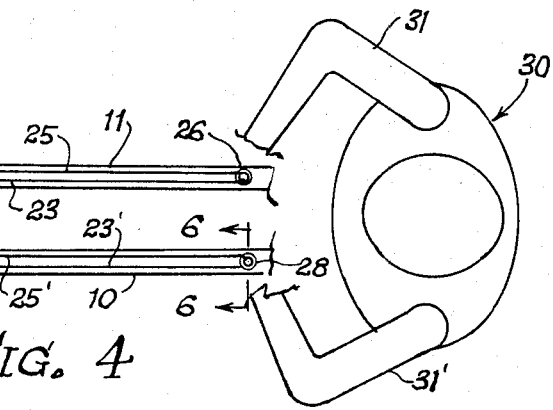
FIG. 4

TRAINING AND CARE APPARATUS FOR HORSES

BACKGROUND OF THE INVENTION

The present invention relates to an indirect control and ministering apparatus to train horses and concurrently administer care as required, particularly as the horse is mounted by its rider, using a non-abusive and non-injurious reward/punishment approach to conditioning the horse to respond properly to commands issued by the horse handler.

Ever since man succeeded in domesticating the horse to use it as an extension of his own limited capabilities, man has had to train horses to respond to his commands properly. Because of the relative position of the horse and the handler, when the horse is being either driven or ridden, the mode of interaction between horse and man, and the degree thereof, are necessarily limited. The major mode of interaction is mostly based on the premise that the horse should either obey and respond properly or be punished (negative feedback only). There is usually no immediate positive feedback between the two parties if and when the horse behaves and responds appropriately, because man normally expects it from the horse who, in turn, has no notion as to why this, instead of that. The positive feedback communication between man and horse is usually limited to voice and physical (patting) contacts. Such feedback media are inherently limitative as to the intensity and the exact meaning of the feedback message. They mostly help man feel good, a state of affair which the horse will eventually construe as being good for him also, as the horse may in time make the correct connection between the expression of the man's feelings (even mood) and the concurrent lack of punishment. Such a hit-and-miss drawn out conditioning process is neither very effective nor temporally efficient, and certainly frustrating to the horse.

Animal trainers known that the consciousness span of their subjects is usually very short, compared to that of man, even shorter for horses than for dogs, for instance. Dispensing rewards or punishments should follow the animal response immediately, or even better, occur concurrently. Instant gratification is most meaningful and effective. To emphasize the reward value, the punishment should be administered the same way as the reward is, and not only by its absence. A correlation between the causes and the effects is much more easily made when sensations result from the same type of stimulation (sense and location), though such sensations may be of opposite natures. Horses are endowed with the same senses as man. Because two of these senses were particularly useful for the survival of the species, horses have keen senses of hearing and taste. Also, because of the special and unique conformation of the horse's mouth and jaws, from time immemorial, man has used objects inserted in the horse's mouth to govern him, and sometimes, to administer punishment.

Thus it seem logical, practical, efficient and natural to utilize such already existing controlling and punishing means, positioned where the sense of taste is located, for also dispensing rewards. It is therefore desirable to combine the control/punishing means now universally used for horses with the reward dispensing apparatus.

SUMMARY OF THE INVENTION

It is therefore a primary object of the present invention to provide a reward/punishment apparatus that can be used to train horses in a very effective non-injurious and non-abusive humane manner.

It is another object of the present invention to provide a reward/punishment apparatus that is combined with and atttached to the means now used to train and govern horses.

It is still another object of the present invention to provide a reward/punishment apparatus that dispenses both reward or punishment, as the case may be, with equal effectiveness and swiftness, as the need for reward or punishment arises.

It is still another object of the present invention to provide a reward/punishment apparatus that permits the ministering of other media such as medication, vitamins, nutrient additives, etc . . . , to horses, as the horse is under his handler's control.

It is still another object of the present invention to provide a reward/punishment apparatus that allows to vary the intensity of the reward or punishment, as the case may be, as the medium is being ministered.

It is still another object of the present invention to provide a reward/punishment apparatus that allows the optimum synchronization of reward (or punishment) dispensing with the concurrent operation of the horse handler's prime means of control.

It is still another object of the present invention to provide a reward/punishment apparatus that facilitates the adjustment of the relative timings of the command and the dispensing of the reward (or punishment, as the case may be) to minimize the time period needed for the horse training and conditioning.

It is still another object of the present invention to provide a reward/punishment apparatus that can be fitted on and readied prior to and independently from the horse bridling.

Accordingly, the present invention provides an apparatus to help train, control and administer care to horses in a uniquely effective and efficient manner, which is humane and beneficial to horses, whereby both positive and negative feedback communications between horse and handler are instantly and constantly present and ready to use, as applicable and proper.

DESCRIPTION OF THE DRAWINGS

FIG. 1 is a simplified perspective view of a typical bridle showing how the present invention apparatus is installed.

FIG. 2 is a front view of a typical bar bit modified for reward/punishment medium ministering.

FIG. 3 is a top view of the bar bit shown in FIG. 2.

FIG. 4 is a diagrammatic representation of the present invention apparatus.

FIG. 5 is a side elevation view of one of the two medium storing, pumping and metering component assemblies of the dispensing overall system shown in FIG. 4.

FIG. 6 is a transversal sectional view of a switch assembly mounted on one rein and taken along section line 6—6 of FIG. 4.

FIG. 7 is a midsectional elevation view of the medium pumping and metering components of the dispensing system shown in FIG. 4.

FIG. 8 is a partial midsectional elevation view of the pumping and metering device outlet check valve of the system shown in FIG. 7.

DETAILED DESCRIPTION OF THE INVENTION

Referring to FIG. 1, a typical bridle is shown in solid lines and consists generally of a crownpiece 1, a headband 2, a noseband 3, a throatlatch 4, two cheek straps 5 and 6, two rings 7 and 8, to which snaffle bit 9 and reins 10 and 11 are linked and attached. Shown in phantom lines for easier identification and in a diagrammatic fashion for the sake of clarity, are the major components of the present invention apparatus. Only one typical fluid storing, pumping and metering assembly 20 is shown attached to cheek strap 6 by fasteners 12 and 13. Another similar (and symmetrically mounted) unit 22, not shown for the sake of illustration simplification, is mounted on the other side of the horse's head, which fits between the two cheek straps, onto cheek strap 5. A battery 21 is mounted on headband 2 and secured by fastener 14. Electrical leads 23 and 25, attached to headband 2 and cheek strap 6, brings the battery current to assembly 20 and to switch 26 (not shown in FIG. 1) mounted at the location selected by the rider on rein 11 for easiest handling. The fluid (reward or punishment medium) used in the apparatus is stored in assembly 20 and comes down through tube 15 to connect with flexible tube 16 directly connected to snaffle bit conduit 17 leading to exit orifice 18 through which the fluid finally exhausts into the horse's mouth, above his tongue.

FIGS. 2 and 3 depict a bar bit 19 which can be used instead of a snaffle bit. The fluid ducting and dispensing means are easily identifiable and recognizable. Phantom lines 7' and 8' indicates the positions that rings 7 and 8 normally assume when the reins are pulled back by the rider. The relative positions of rings 7 and 8, and of flexible tubes 16 and 16', are such that these parts cannot interfere physically. In FIG. 4, a rider 30, astride a horse (not shown), is shown seen from the top, with his arms 31 and 31' in position to hold reins 10 and 11. His hands (not shown) are in a position such that the action of one finger (preferably his thumb) can easily activate switches 26 or 28. Electrical leads 23, 25, 23' and 25' are attached to the reins, from the horse's mouth station to their respective corresponding switches.

Referring to FIG. 5, the fluid storing and metering system comprises a flexible bag 40, full of fluid 41, a connecting duct 42, a pumping and metering device 43, an outlet check valve assembly 44 from which tube 15 finally emerges. Assembly 20 is solidly affixed to base plate 45 so that it can easily be installed on or removed from cheek strap 6. Bag 40 collapses as fluid 41 is dispensed. When full, its contour assumes the position shown by phantom line 40'. Bag 40 is filled through inlet 46, closed by cap 47. To avoid fluid sloshing, the amount of air trapped in top cavity 48 is minimized by properly locating inlet 46 and shaping bag 40. FIG. 6 shows the details of the securing and operation of switch 28, with plunger 51 being pushed by rider's thumb 50. The lower end of plunger 51 actuates conducting spring leaf 52 that contacts another conducting leaf 53 when plunger 51 is fully depressed, to establish electrical connection between leads 23' and 25'. Switch 28 is mounted on clasp 55 held firmly on rein 10 by leaf springs 54 and 56.

Referring to FIGS. 7 and 8, the fluid pumping and metering device presented consists of an electromagnet 60 connected to electrical leads 23. When activated, pusher plate 61 is pulled toward the right and compresses spring 62. This action opens orifice 63, pulls flexible membrane 64 back, thus causing inside volume 65 to increase. Check valve 44 opposes reentry of the fluid already in tube 15 and fresh new fluid is sucked in from gravity feeding bag 40. Check valve 66 opens and volume 65 augments in size. When electromagnet 60 is deactivated, spring 62 pushes back plate 61 toward the left, until valve seat 68 closes orifice 63. As this happens, volume 65 is made to decrease, check valve 66 closes and the excess fluid is forced to flow through orifice 69 and exhaust duct 70. Each full activation cycle of the electromagnet sets the maximum amount of fluid that can be pumped out through exhaust duct 70, and in the horse's mouth. Ball 71 of check valve 66 is very light and is always floating against its conically shaped seat and ready to close instantly. The detail of check valve 44, which consists of one single membrane 80, is shown in FIG. 8. The center of membrane 80 is dome-shaped and a slit 83 is cut through the wall of that dome so that two lips 81 and 82 can open slit 83 or close it tight, depending upon the direction in which the pressure differential is applied across membrane 80. As plate 61 is pulled by electromagnet 60, when activated, volume 65 increases only slowly in size, because of the flow restriction presented by duct 67. If plate 61 is released before the full amount of fluid has been sucked into volume 65, the fluid amount pumped out is then less.

DISCUSSION AND OPERATION

Usually and most generally, only three of the five senses of horses have been used to train, control and govern them, namely: touch, hearing and sight. The sense of sight is used in a negative way, by limiting it (blinkers) to minimize the distracting and/or scaring effect that unusual visual perceptions have on horses. Horses have a keen and highly directional sense of hearing. It is exploited by man to communicate with horses by means of voice tone, pitch and volume, and very effectively. The horse's sense most and best exploited by man is that of touch, applied mostly by means of the horse's skin and mucous membrane of the horse's mouth. Skin touch can take the form of hand patting and stroking, poking, local pressure application, striking and/or lashing. Pressure can be applied locally by the rider's legs and/or hands. Poking, striking and/or lashing necessitate the use of intermediary objects such as spurs, sticks, riding crops, whips, etc. . . . , and may be applied onto various parts of the horse's body. However, the use of the sense of touch of the mucous membrane of the horse's mouth is universally exploited by means of locally applied pressure exerted by the bit, positioned and held by the bridle components, actuated by reins under the handler's control. Various types of bits have evolved throughout the ages and many are still now in use. Until and unless the horse "bites the bit" (gets hold of it between the molar teeth of both jaws), the handler retains effective control of the horse, by applying pressure on the lower jaw by means of that bit. The intensity and exact location of that pressure vary greatly depending upon the type of bit used and the results sought by the handler. These end results also vary greatly depending upon the experience of the handler and the horse's mouth conditions, for any given degree of pressure. The bit and its extension, the reins, have thus constituted the main line of communication between horses and men, whenever man wanted to coerce a horse into performing a certain task or achieving a specific body movement.

This main line of communication is very effective indeed, but in only one way: to give directions to the horse (and to punish him, as circumstances require). The bit can in no way be used for rewarding the horse, again as the circumstances might warrant at times, as long as the bit actions can only be perceived by the horse as only an unpleasant pressure. However, the perception means of another sense are also located in the horse mouth: the sense of taste. This sense is occasionally utilized by man to reward horses, but usually never at the time the horse is performing well the task or the body motion demanded of him. The effectiveness of animal training and conditioning is predicated on two conditions: (1) the reward (or punishment, as the occasion warrants) should be immediate, and (2) the animal should get the impression (no matter how incorrect) that it itself is the cause of and is responsible for those effects, and that the trainer had seemingly no connection with them. If and when such effects are applied concurrently and in conjunction with any and all others already exploited by horse handlers, the bond, and its quality and intensity, that usually (and should) results between trainer and trainee can only be enhanced.

Horses have a "sweet tooth" and are partial to such items as sugar, candy, apples, carrots, etc. . . . As a corollary, they also have a natural aversion for some tastes such as bitter, in common to most mammals. Some of such foul or bitter tasting products are even healthier for the horse than sweets. Also, some horses are reluctant to take the bit (and who could blame them). A sweet tasting bit would certainly be more enticing!

The present invention, as described hereinafter, shows how such objectives can easily be reached. To that effect, the construction of the invention apparatus provides:

(1) a bit modified to facilitate the introduction of either one of two liquids, directly into the horse's mouth, near the bit middle part;

(2) two storage tanks, one for each one of the two liquids;

(3) two pumping and metering devices, one for each one of the two liquids;

(4) a battery to provide the electrical power needed to energize the pumping and metering devices;

(5) two manually operated electrical switches, one for each one of the two pumping and metering devices, mounted on each rein;

(6) two sets of electrical lines, affixed to and supported by the various bridle parts, to interconnect the battery, the switches and the pumping and metering devices; and (7) two sets of tubing connections between the modified bit, the pumping and metering devices, and the storage tanks.

The exact nature of the two liquids (sweet and foul tasting) is not important, provided that such liquids are not injurious, abusive, unhealthy, habit forming, etc. . . . , for either horse or man. These liquids should contain no solid particles, crystals and/or gum forming compound which could cause the formation of deposits. They should also permit easy and quick rinsing and cleaning of those parts that come in contact with such liquids. Two examples of such liquids could be condensed filtered carrot juice (reward) and most bitter soluble compounds of quinine or the like (punishment). Such liquids can also contain, and be made carriers for, soluble forms of additives such as medication, vitamins, minerals, food supplements, etc . . . , which are beneficial to the horse's health on a regular routine, or that may be specifically needed by the horse at times.

The dispensing of the rewarding or punishing liquids (hereinafter referred to as reward and punishment) is always accomplished by and left to the decision of the horse trainer or rider. Like the bit itself, the invention apparatus should always be used judiciously and timely. Also, after a horse has been adequately trained (or reconditioned) by means of the invention apparatus, the degree of intensity and frequency of both reward and punishment should be gradually decreased so that, eventually, water only is used, at least for the reward side, unless additives, pleasant tasting, are needed for health reasons. The punishment side can then be used only for the dispensing of unpleasant tasting medication and/or nutrient additives. Specially on long rides, in hot weather, etc., the freshening up feeling in the horse's mouth provided by a very small amount of water constitutes by itself a treat and a satisfactory reward, not to speak of the health benefits to the rider's mount.

To minimize the amount of fluid required for each ministering operation, the liquid must be delivered as closely as possible to the taste buds on the horse's tongue. Therefore, exit orifices 18 and 18' must be located on the bit side facing the horse's throat. This also contributes in minimizing the amount of foul tasting liquid that the horse may attempt to "spit out". Bits are usually made of metals, but sometimes of hard leather. In both cases, ducts 17 and 17' can consist of a short stainless tube brazed to the bit side (metals) or embedded into the leather bit. The duct end located in the horse's mouth is cut and chamfered to avoid injury to the horse's tongue, which is made easier by locating the duct on the side of the bit that is facing the throat. The other end of the duct emerges at an angle (FIG. 3) and in a direction such that neither the lips nor the tongue of the horse can reach it. A flexible tube positioned sideway (24) then connects this duct end to tube 15 in a manner such that rings 7 and 8, and reins 10 and 11 do not interfere. These two flexible connecting tubes 24 (one on each side) can be bundled with electrical lines 23 and 25 to minimize the apparent complexity of the assembling between the various components. The bundling of tubes and electrical lines makes a loop large enough to minimize its influence on the free movement of the bit in any and all directions. With a full bridle (English bridles: e.g. Pelham, Weymouth, etc. . . . ) a second set of reins is used to operate a curb. The present invention apparatus is compatible with and allow the use of such more complex bridles. It can also easily be constructed not too interfere with the operation of the components of such a more complex bridle.

In addition to the normal motion of the horse's head, the horse may at times shake his head in other direction. The heaviest components such as the battery, the fluid containers and the pumping and metering devices must be firmly and solidly attached to their supports by positive fastening and locking mechanisms that allow no slack. Many such types of fasteners are available and need not be discussed here. The fasteners 12 shown in FIG. 5 for illustration purpose only is of the engaging-twisting type (90° turn). Because of gravity, the fluid container pouch (bag 40) changes shape as fluid 41 is expended and is allowed to decrease freely in volume in the process, so that no extra air is admitted into the bag and any such air can easily be let out of the bag when required.

The double clasp type of securing provided for switches 26 and 28 onto reins 11 and 10 can easily be understood and needs no further discussion. The side of rein onto which the switches are mounted would only depend upon the rider's preference, whether he wants to use his thumbs or his forefingers to actuate plunger 51. Also, the selection of the side affected to reward and punishment is up to the rider, who needs only be consistent so that handlers do not get confused (right could be for reward and left could be for punishment, in the case of a right-handed handler). If and when the horse is tempted to exert a sucking action on the bit (after the ministering of a reward), the fact that both reward and punishment would then be sucked in concurrently should be enough to discourage further attempts. However, the introduction of saliva into ducts 17 and 17' must be prevented (horse fighting punishment). This is done by keeping tubes 24 flexible longitudinally but neither expandable nor stretchable. Check valve 44 is also constructed to stop back up flow.

Because both sides of the present invention apparatus are mirror images of each other, the detailed discussion of the operation of only one side suffices, in which case the word fluid is used to refer to the dispensing of either reward or punishment. Assuming that the horse handler has chosen to dispense fluid, he pushes plunger 51 on the appropriate switch, 26 for instance. Electrical current is then allowed to pass through line 23, closing the electrical circuit and thereby energizing electromagnet 60. At that time, seat 68 of plate 61 was holding orifice 63 closed, by means of spring 62 action. The magnetic force exerted on plate 61, when electromagnet 60 is energized, is at least equal to twice the force then exerted by spring 62 in the opposite direction. Upon closing of switch 26, plate 61 starts moving toward the right and flexible membrane 64 is then solicited to move likewise. A negative pressure develops in volume 65 and fluid starts moving in, so that membrane 64 can move again against plate 61. Because the cross-section of duct 67 is made small on purpose, this filling up process requires a few seconds. At any time during those few seconds, the handler can release plunger 51 of switch 26, in which case spring 62 pushes plate 61, seat 68 and membrane 64 toward the left, interrupting the fluid flow in and initiating the fluid flow out through orifice 69. Depending upon the time duration of the holding period of plunger 51, in the depressed position, the amount of fluid thus expelled from inside volume 65 can be any amount between naught and the maximum amount that the longest holding period of plunger 51 would yield, fixed by the dimensions and physical characteristics of the system for each and every switch activation cycle. The operator thus:

(1) must activate the switch another time if he wishes to dispense an amount of fluid larger than this fixed set maximum value (for the protection of the horse);

(2) must release the pressure on plunger 51 after one, two or three seconds, depending upon the amount of fluid (less than the maximum) that he wishes to dispense on each occasion;

(3) can time both the initiation and the completion of the fluid dispensing with the initiation and completion of the command that he communicated to the horse through other standard channels of communication, enough time is available for that;

(4) is offered a large degree of flexibility in three ways: total amount for each occasion, timing (beginning and end) and medium choice (reward vs punishment);

(5) establishes direct and immediate positive (or negative, as the occasion justifies) feedback with the horse in a manner seemingly (for the horse) unconnected to the handler; and (6) can still use any other alternate external means of communication with the horse that is already available to him.

The battery can be installed at locations other than the headband, as shown in FIG. 1. Another equally suitable position is on the top of crownpiece 1, in a manner such that the battery outer walls do not interfere with the free movement of the horse's ears. In both instances, care is taken to insure that the horse's head movements do not loosen the battery securing means or that its weight do not affect the horse. Another location for the battery is on the front part of the saddle, or pommel. In this arrangement, the electrical lines connecting the battery to the bridle are bundled together under the horse's neck, to reach the bridle on the back part of the noseband (at point X of FIG. 1), from where they reach the cheek straps. The electrical line bundle thus takes the place of a martingale without assuming its role. If a martingale is used as part of the tack equipment of the horse, the electrical line bundle can be then secured to that martingale. The various component electrical leads are connected by quick connect-disconnect connectors as is well known in the art.

The various embodimentss of the present invention discussed above result in a training and care apparatus that provides the means to train, control, govern and administer care to horses in addition to, in conjunction and concurrently with existing means now used, so that the conditioning of the horse to receiving, accepting and obeying commands is facilitated. A judicious, timely and appropriate use of the apparatus, either with horses to be trained or with horses to be reconditioned, thus results in better trained horses, easier to handle, in a much shorter period of time. Bad horse habits are also less prone to develop and can be more easily corrected. The training apparatus can also be effectively used to freshen up the mouth of trained and already conditioned horses on long arduous treks and/or hot days, when water alone needs then be used. It can also be used to administer medication, vitamins, minerals, health additives, when and as needed, to such horses, while they are being exercized and given their work out. Finally, by squirting some of the pleasant tasting fluid, when the bit is presented to a recalcitrant horse, such a horse can then be induced to accept the bit more easily, especially if he has been conditioned not to fear it. Although a battery and electricity are shown being used for fluid pumping and metering, other powering means can be used just as well, such as compressed air either stored or pumped by the handler. When the horse training and conditioning are advanced enough and both the swiftness and the accuracy of the reward and punishment dispensing have become less critical, a simpler pumping system, actuated directly by the handler, can be then used. This is especially the case when the use of pleasant and unpleasant tasting fluids is no longer required for a given horse. Therefore, the present invention apparatus, either in the form illustrated herein or in a simplified version form, should prove very useful to horse trainers, riders and horse lovers alike.

Having thus described my invention, I now claim:

1. A horse training apparatus, comprising:

means for storing a quantity of a fluid;

means for mounting the fluid storing means on a body portion of a horse;

conduit means for delivering fluid to the horse's mouth;

pump means for drawing fluid from the storing means and propelling it through the conduit means; and control means actuable by a handler for selectively operating the pump means.

2. An apparatus according to claim 1 wherein the mounting means includes a bridle.

3. An apparatus according to claim 2 wherein the conduit means delivers fluid through a bit portion of the bridle.

4. An apparatus according to claim 2 wherein the control means extends through at least one of a pair of reins connected to the bridle.

5. An apparatus according to claim 2 wherein the pump means includes a battery supported by the bridle, an electrically energized pump powered by the battery and also supported by the bridle, and means for electrically connecting the pump means to the battery.

6. An apparatus according to claim 1 and further comprising:

means for storing a quantity of a second fluid;

means for mounting the second fluid storing means on the body portion of the horse;

second conduit means for delivering the second fluid to the horse's mouth;

second pump means for drawing the second fluid from the second fluid storing means and propelling it through the second conduit means; and second control means actuable by the handler for selectively operating the second pump means.

7. An apparatus according to claim 3 wherein the conduit means delivers the fluid through a location in the bit portion such that the fluid is injected adjacent to a set of taste buds on the tongue of the horse.

8. An apparatus according to claim 5 wherein the battery is supported by a headband portion of the bridle and the electrical connecting means is affixed to a cheek strap portion of the bridle.

9. An apparatus according to claim 1 wherein the pump means includes a battery supported on a saddle mounted on the horse.

10. An apparatus according to claim 1 wherein the pump means includes a collapsible reservoir.

11. An apparatus according to claim 2 wherein the control means extends along at least one of a pair of reins connected at one end to the bridle.

12. An apparatus according to claim 1 wherein the control means includes means for automatically causing a predetermined delay between consecutive operations of the pump means.

13. An apparatus according to claim 10 wherein the pump means comprises means responsive to the control means for progressively collapsing the reservoir.

* * * * *